US012706563B2

(12) United States Patent
Guo et al.

(10) Patent No.: US 12,706,563 B2
(45) Date of Patent: Aug. 11, 2026

(54) SUPPORT STRUCTURE AND PHOTOVOLTAIC TRACKING SUPPORT

(71) Applicant: Mokun Renewable Technology Co., Ltd., Shanghai (CN)

(72) Inventors: Jiabao Guo, Shanghai (CN); Xiao Liu, Shanghai (CN)

(73) Assignee: Mokun Renewable Technologies Co., Ltd., Shanghai (CN)

( * ) Notice: Subject to any disclaimer, the term of this patent is extended or adjusted under 35 U.S.C. 154(b) by 0 days.

(21) Appl. No.: 18/671,408

(22) Filed: May 22, 2024

(65) Prior Publication Data

US 2025/0088140 A1 Mar. 13, 2025

(51) Int. Cl.
*H02S 20/32* (2014.01)

(52) U.S. Cl.
CPC .................................... *H02S 20/32* (2014.12)

(58) Field of Classification Search
None
See application file for complete search history.

(56) References Cited

U.S. PATENT DOCUMENTS 8,939,648 B2 * 1/2015 Schneider ............... F24S 25/70 384/444
9,806,669 B2 * 10/2017 Michotte De Welle .................... F16M 11/10
10,944,354 B2 * 3/2021 Ballentine ............... H02S 30/10
11,946,587 B2 * 4/2024 Dally ...................... F24S 40/85
12,301,163 B2 * 5/2025 Ballentine ............... F16C 17/02
2022/0278642 A1 * 9/2022 Kumar .................... H02S 20/32
2025/0088141 A1 * 3/2025 Mapati .................... H02S 20/32

* cited by examiner

*Primary Examiner* — Steven M Marsh
(74) *Attorney, Agent, or Firm* — GREENBERG TRAURIG LLP; Trenton A. Ward

(57) ABSTRACT

Embodiments of the present disclosure provide a support structure and a photovoltaic tracking support, which relate to the field of photovoltaic power generation technology. The support structure comprises a bearing base, an arc bearing, a first roller, and a second roller, the first roller being rotatably connected to the bearing base, the second roller being rotatably connected to the bearing base, the arc bearing being used to support a main beam of the photovoltaic tracking support, the first roller being used for rolling and abutting the arcuate outer sidewall of the arc bearing and the second roller being used for rolling and abutting the arcuate inner sidewall of the arc bearing for rotating the arc bearing relative to the bearing base. The support structure is capable of maintaining the normal motion of the main beam on the set motion trajectory to ensure that the photovoltaic tracking support is able to operate normally in tracking azimuth changes of the sun.

20 Claims, 9 Drawing Sheets

SUPPORT STRUCTURE AND PHOTOVOLTAIC TRACKING SUPPORT

This application claims priority to Chinese Application No. 202311156159.8, filed Sep. 7, 2023, published as Chinese Application Publication No. CN 117134699A on Nov. 28, 2023, the contents of which are hereby incorporated by reference in the entirety fully set forth below.

TECHNICAL FIELD

The present disclosure relates to the field of photovoltaic power generation technology, and in particular, to a support structure and a photovoltaic tracking support.

BACKGROUND ART

In a photovoltaic power generation system, the flat single-axis tracking support is one of the commonly used forms of photovoltaic support. As the support is capable of operating by tracking the azimuth changes of the sun in the day, the total annual power generated by photovoltaic modules that use a flat single-axis tracking support is 15%-25% higher than that by photovoltaic modules that use an optimal fixed tilt angle support. Due to the need to rotate about the axis, a main beam typically needs to be disposed in the middle of such flat single-axis tracking supports to support the photovoltaic module. The photovoltaic module is mounted above the main beam and rotates around the main beam, with the center thereof as the axis.

However, for such structures, during strong winds, the rotating portion of the tracking support produces an upward or downward deflection trend, making it impossible to maintain the normal motion of the main beam on the set motion trajectory, affecting the operation of the tracking support in tracking the azimuth changes of the sun.

SUMMARY OF THE INVENTION

The present disclosure provides a support structure and a photovoltaic tracking support that are capable of maintaining the normal motion of the main beam on the set motion trajectory to ensure the normal operation of the photovoltaic tracking support in tracking azimuth changes of the sun.

Embodiments of the present disclosure may be implemented as follows:

- in a first aspect, the present disclosure provides a support structure, comprising:
- a bearing base;
- a first roller rotatably connected to the bearing base;
- a second roller rotatably connected to the bearing base; and
- an arc bearing for supporting a main beam of a photovoltaic tracking support, the first roller being used for rolling and abutting an arcuate outer sidewall of the arc bearing, and the second roller being used for rolling and abutting an arcuate inner sidewall of the arc bearing for rotating the arc bearing relative to the bearing base.

In an optional embodiment, the arc bearing comprises a support plate and an arcuate plate, the arcuate plate having the arcuate inner sidewall and the arcuate outer sidewall, the support plate and the arcuate inner sidewall being connected, and the support plate being used to support the main beam of the photovoltaic tracking support.

In an optional embodiment, the support plate is provided with a limiting groove for supporting the main beam.

In an optional embodiment, a portion of the arcuate outer sidewall is recessed toward the arcuate inner sidewall to form and provide a roller guide slot, and the first roller being used for rolling and abutting the roller guide slot.

In an optional embodiment, there is a plurality of the roller guide slots and the first rollers, the plurality of the roller guide slots being distributed in parallel, and at least one of the first rollers being used for rolling and abutting one of the roller guide slots.

In an optional embodiment, the bearing base comprises a connecting plate, a first plate body, a second plate body, and a through shaft, the first plate body and the second plate body being disposed at intervals on the connecting plate, and the through shaft passing through the first plate body and the second plate body simultaneously;

- wherein the plurality of the first rollers rotate about the same through shaft.

In an optional embodiment, the bearing base further comprises a cantilevered shaft connected to the first plate body, with the second roller rotatably connected to the cantilevered shaft.

In an optional embodiment, the support structure further comprises a limiting element connected to the arc bearing, and the limiting element being used to abut the second roller when the arc bearing is rotated to an extreme position.

In an optional embodiment, the axis of rotation of the first roller and the axis of rotation of the second roller are parallel.

In an optional embodiment, the support structure comprises a plurality of sets of rollers that are respectively located at a plurality of support positions distributed at intervals on the arc bearing;

- wherein there is a plurality of the first rollers and the second rollers, and the first roller and the second roller located at the same support position of the arc bearing constitute one set of rollers.

In a second aspect, the present disclosure provides a photovoltaic tracking support, comprising a main beam and the support structure as described in any of the preceding embodiments, and the arc bearing of the plurality of the support structures are mounted at intervals along the length direction of the main beam.

In an optional embodiment, the center point of the arc bearing is disposed between the upper end face or highest point of the main beam and the center of the main beam, and the center of the arc bearing is located on the centerline in the vertical direction of the main beam.

Benefits of the support structure and photovoltaic tracking support of the examples of the present disclosure include, for example The present disclosure provides a support structure comprising a bearing base, an arc bearing, a first roller and a second roller, the first roller being rotatably connected to the bearing base; the second roller being rotatably connected to the bearing base; the arc bearing being used to support a main beam of the photovoltaic tracking support, the first roller being used for rolling and abutting the arcuate outer sidewall of the arc bearing, and the second roller being used for rolling and abutting the arcuate inner sidewall of the arc bearing for rotating the arc bearing relative to the bearing base. Since both the first roller and the second roller are capable of limiting the motion of the bearing base, typically under gravity, the photovoltaic tracking support is supported on the first roller at the arcuate outer sidewall of the bearing base through the arc bearing. During strong winds, the rotating portion of the photovoltaic tracking support produces an upward or downward deflection trend. At this point, the arc bearing is abutted and limited by the second roller at the arcuate inner sidewall, preventing upward deflection or the arc bearing is abutted and limited by the first roller at the arcuate outer sidewall, preventing downward deflection, such that it is always on the set motion trajectory, thereby maintaining the normal motion of the main beam on the set motion trajectory and ensuring the normal operation of the photovoltaic tracking support in tracking azimuth changes of the sun.

The present disclosure provides a photovoltaic tracking support comprising a main beam and the support structure described above. The arc bearings of the plurality of support structures are mounted at intervals along the length direction of the main beam, and the photovoltaic tracking support has all the functions of the support structure described above.

DESCRIPTION OF DRAWINGS

In order to more clearly explain the technical solution of the examples of the present disclosure, the accompanying drawings required in the examples will be briefly introduced below. It should be understood that the following accompanying drawings only show certain examples of the present disclosure, and therefore should not be regarded as limiting the scope. For those skilled in the art, other related accompanying drawings may also be obtained from these accompanying drawings without creative labor.

Figure 1:
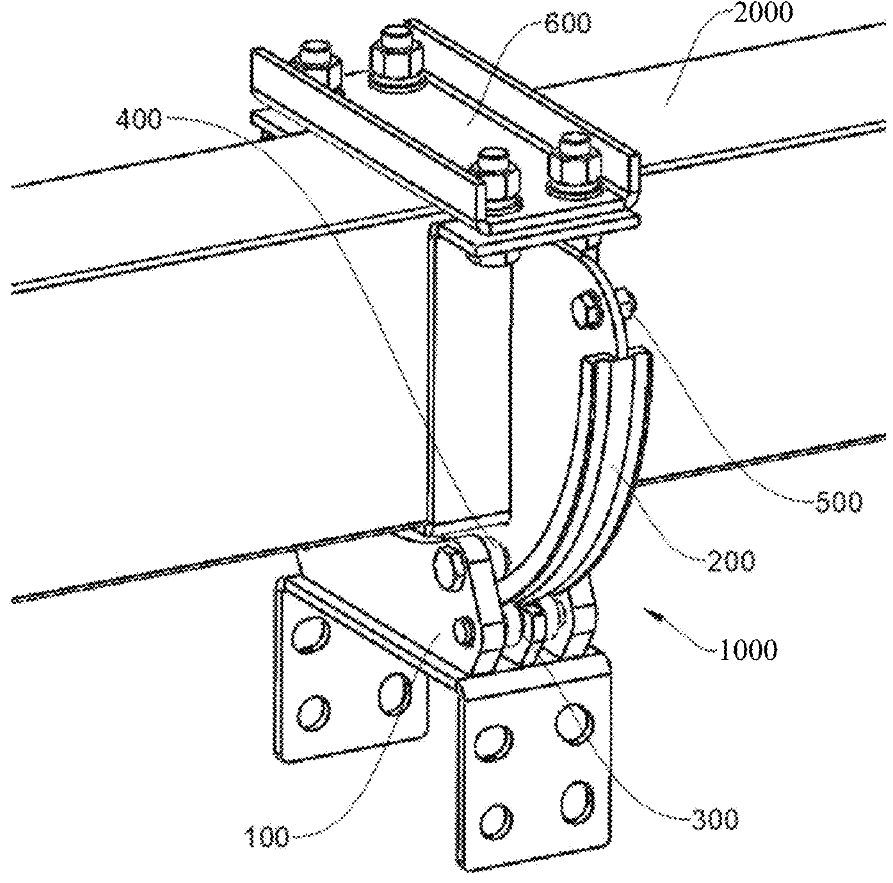
FIG. 1 is a schematic diagram of a photovoltaic tracking support provided in an example of the present disclosure.

Icons: 1000—support structure; 100—bearing base; 110—connecting plate; 120—first plate body; 130—second plate body; 140—through shaft; 150—cantilevered shaft; 200—arc bearing; 201—center point; 210—support plate; 211—limiting groove; 220—arcuate plate; 221—arcuate outer sidewall; 222—arcuate inner sidewall; 223—roller guide slot; 300—first roller; 400—second roller; 500—limiting element; 600—platen; 2000—main beam; 2001—upper end face; 2002—center; 2003—highest point; 2010—centerline.

SPECIFIC EMBODIMENTS

In order to make the object, technical solutions and advantages of the examples of the present disclosure clearer, the technical solutions of the examples of the present disclosure will be clearly and completely described below in conjunction with the accompanying drawings of the examples of the present disclosure. Obviously, the described examples are part of the examples of the present disclosure and not all of the examples. Typically, the components of the examples of the present disclosure described and shown in the accompanying drawings herein may be arranged and designed in various different configurations.

Thus, the following detailed description of the examples of the present disclosure provided in the accompanying drawings is not intended to limit the scope of the claimed present disclosure, but merely to represent the selected examples of the present disclosure. Based on the examples in the present disclosure, all other examples obtained by those skilled in the art without creative labor are within the scope of protection of the present disclosure.

It should be noted that similar marks and letters refer to similar items in the following accompanying drawings, so once an item is defined in an accompanying drawing, it need not be further defined and explained in the subsequent accompanying drawings.

In the description of the present disclosure, it should be noted that if the orientation or positional relationship indicated by the terms "upper", "lower", "inner", "outer", and the like, it is based on the orientation or positional relationship shown in the accompanying drawings, or the customary orientation or positional relationship during the use of the inventive product merely to facilitate the description of the present disclosure and simplify the description, rather than indicating or implying that the device or element indicated must have a specific orientation or be constructed and operated in a specific orientation, so it cannot be understood as a limitation of the present disclosure.

Furthermore, the terms "first," "second," and the like, are used only to make a distinct description and are not to be construed as indicating or implying relative importance.

It should be noted that characteristics in the examples of the present disclosure may be combined with each other as long as they do not conflict.

As mentioned in prior art, in photovoltaic power generation systems, the flat single-axis tracking support is one of the most commonly used photovoltaic array support. As the support is capable of operation by tracking the azimuth changes of the sun during the day, the total annual power generated by photovoltaic modules using a flat single-axis tracking support is 15%-25% higher than that by photovoltaic modules that use an optimal fixed tilt support. Due to the need to rotate about the axis, a main beam typically needs to be disposed in the middle of such flat single-axis tracking supports to support the photovoltaic module. The photovoltaic module is mounted above the main beam and rotates around the main beam, with the center thereof as the axis.

However, for such structures, during strong winds, the rotating portion of the tracking support produces an upward or downward deflection trend, making it impossible to maintain the normal motion of the main beam on the set motion trajectory.

Furthermore, due to the relatively long main beam in the north-south direction and the relatively small torsional rigidity of such structures, it is very prone to producing torsional resonance under the action of strong winds, which in turn causes devastating damage to the tracking support.

To this end, oscillation damping rods are often mounted in prior art to mitigate oscillations caused by strong winds. However, this measure is not ideal in actual applications, particularly when the cross-sectional dimensions of the components mounted on the main beam are large, and using this measure alone will still cause the tracking support to be damaged.

In view of this, please refer to FIGS. 1-13. The support structure 1000 and photovoltaic tracking support provided in the examples of the present disclosure are capable of solving this problem, and they will be described in detail below.

Figure 2:
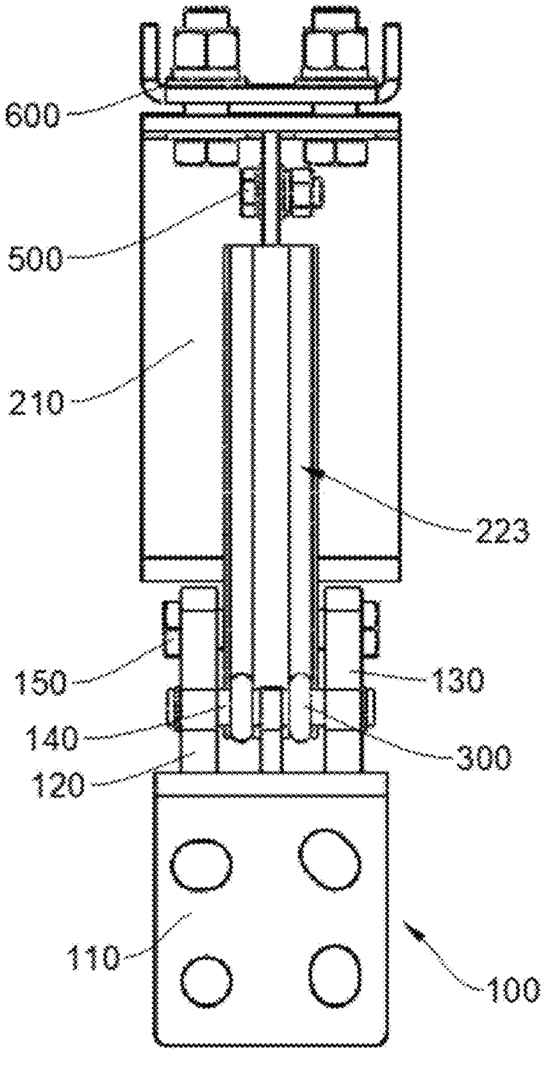
FIG. 2 is a side view of a support structure provided in an example of the present disclosure.
Figure 3:
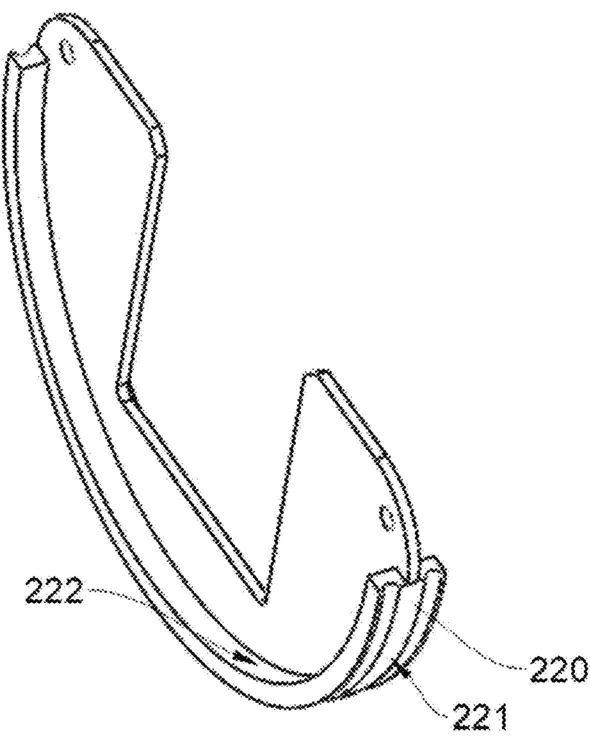
FIG. 3 is a schematic diagram of an arcuate plate provided in an example of the present disclosure.

Referring first to FIGS. 1-3, the present disclosure provides a photovoltaic tracking support comprising a main beam 2000 and a support structure 1000. The arc bearing 200 of the plurality of support structures 1000 (detailed below) are mounted at intervals along the length direction of the main beam 2000. The support structure 1000 allows the photovoltaic tracking support to maintain the normal motion of the main beam 2000 on the set motion trajectory to ensure the normal operation of the photovoltaic tracking support in tracking azimuth changes of the sun.

It should be noted that in the present example, the photovoltaic tracking support is a flat single-axis tracking support.

In particular, the support structure 1000 comprises a bearing base 100, an arc bearing 200, a first roller 300, and a second roller 400, the first roller 300 being rotatably connected to the bearing base 100; the second roller 400 being rotatably connected to the bearing base 100, the arc bearing 200 being used to support the main beam 2000 of the photovoltaic tracking support, the first roller 300 being used for rolling and abutting the arcuate outer sidewall 221 of the arc bearing 200, and the second roller 400 being used for rolling and abutting the arcuate inner sidewall 222 of the arc bearing 200 to rotate the arc bearing 200 relative to the bearing base 100.

Since both the first roller 300 and the second roller 400 are capable of limiting the motion of the bearing base 100, typically under gravity, the photovoltaic tracking support is supported on the first roller 300 at the arcuate outer sidewall 221 of the bearing base 100 through the arc bearing 200. During strong winds, the rotating portion of the photovoltaic tracking support produces an upward or downward deflection trend. At this point, the arc bearing 200 is abutted and limited by the second roller 400 at the arcuate inner sidewall 222, preventing upward deflection or the arc bearing 200 is abutted and limited by the first roller 300 at the arcuate outer sidewall 221, preventing downward deflection, such that it is always on the set motion trajectory. In other words, the bearing base 100 always rotates on the set motion trajectory, thereby maintaining the normal motion of the main beam 2000 on the set motion trajectory and ensuring the normal operation of the photovoltaic tracking support in tracking azimuth changes of the sun.

It should be noted that the arc bearing 200 comprises a support plate 210 and an arcuate plate 220, the arcuate plate 220 having the arcuate inner sidewall 222 and the arcuate outer sidewall 221, the arcuate plate 220 having a semi-circular arc shape, the support plate 210 and the arcuate inner sidewall 222 being connected, and the support plate 210 being used to support the main beam 2000 of the photovoltaic tracking support, wherein, a portion of the wall of the arcuate outer sidewall 221 is recessed toward the arcuate inner sidewall 222 to form and provide a roller guide slot 223, and the first roller 300 is used for rolling and abutting the roller guide slot 223. At the same time, the roller guide slot 223 also has a semi-circular arc shape, i.e., the roller guide slot 223 extends along the peripheral edge of the arcuate plate 220.

The roller guide slot 223 is capable of guiding the rolling of the first roller 300 (shown in FIG. 5), and at the same time, because the roller guide slot 223 is capable of limiting the first roller 300, it limits the movement of the arc bearing 200 in the axial direction, wherein the second roller 400 may have the same structure of the first roller 300, and the specific structure of the second roller 400 may refer to the structure of the first roller 300.

It is easy to understand that, in the present example, the axis of rotation of the first roller 300 and the axis of rotation of the second roller 400 are parallel, and at the same time, the axis of rotation of the first roller 300 is also parallel to the axis of rotation of the arc bearing 200.

In order to prevent the first roller 300 and the second roller 400 from sliding out of the arc bearing 200, the support structure 1000 further comprises a limiting element 500, which may be a bolt. The limiting element 500 and the support plate 210 of the arc bearing 200 are connected, and the limiting element 500 is used to abut the second roller 400 when the arc bearing 200 rotates to an extreme position.

There are two limiting elements 500 herein, and two round holes are opened on the support plate 210 to facilitate the installation of bolts, i.e., there are two extreme positions, which may be understood herein as the maximum angle of deflection of the arc bearing 200 in the east-west direction. Where there is no deflection, it should be understood that the rotating part of the photovoltaic tracking support is at a rotation angle of 0°, which is a wind-resistant working condition at this point.

It should be noted herein that the rotating portion of the photovoltaic tracking support should be understood as a structure that deflects in the east-west direction with the arc bearing 200.

It should be noted that there is a plurality of roller guide slots 223 and first rollers 300, the plurality of roller guide slots 223 are distributed in parallel, and at least one of the first rollers 300 is used for rolling and abutting one of the roller guide slots 223. It should be noted that in the present example, plurality may be understood as at least two.

In the present example, there are two roller guide slots 223 that are distributed in parallel. In particular, two first rollers 300 are used for rolling and abutting the same roller guide slot 223.

Of course, in other examples, there may also be three roller guide slots 223, and the three first rollers 300 may be used for rolling and abutting the same roller guide slot 223.

In order to avoid resonance, referring again to FIG. 1, the support structure 1000 comprises a plurality of sets of rollers located at a plurality of support positions distributed at intervals on the arc bearing 200, wherein there is a plurality of first rollers 300 and second rollers 400, and the first roller 300 and second roller 400 located at the same support position of the arc bearing 200 form one set of rollers.

In the present example, the support structure 1000 comprises two sets of rollers that are respectively located at two support positions distributed at intervals on the arc bearing 200, and the first roller 300 and second roller 400 located at the same support position of the arc bearing 200 form one set of rollers, wherein, each set of rollers comprises two first rollers 300 with the same axis of rotation, and at the same time, comprises two second rollers 400 that are located on opposite sides of the support plate 210.

In this way, two pairs of rollers corresponding to the inner and outer sides of the bearing base 100 form two fulcrums for the arc bearing 200 and the spacing between these two fulcrums is relatively wide. Therefore, the vertical line of gravity of the rotating part of the photovoltaic tracking support is always between the two fulcrums within a certain range of rotation angle.

This allows the rotating part of the photovoltaic tracking support to not produce additional eccentric torque due to shaking from strong winds when the rotation angle is 0° under wind-sheltering working conditions.

At the same time, under normal operating conditions, a driver can transmit the rotation force along the center of the main beam 2000 through the main beam 2000, and drive the main beam 2000 and the arc bearing 200 to slowly rotate on the bearing base 100. However, due to the uncertainty of the vector direction of the force under the action of strong winds, the component of rotation of the main beam 2000 is relatively small, and this two-point supporting structure often forms a tilting force centered at a certain point thereof, making it difficult to form a regular oscillating torque. Therefore, it can effectively inhibit the oscillation of the rotating part of the tracking support, and will not cause resonance, avoiding damage to the photovoltaic tracking support.

Furthermore, it should be noted that there may be three, four, five, and the like of sets of rollers. The more sets of rollers, the more support points, and the smoother the rotation of the arc bearing 200, wherein it should be noted that, in the present example as shown in FIG. 3, since the length of the support plate 210 in the direction of the axis of rotation of the arc bearing 200 is shorter than the length of the arcuate plate 220 in the direction of the axis of rotation of the arc bearing 200, the thickness of the support plate 210 is less than the thickness of the arcuate plate 220.

Accordingly, the edges of the arcuate plate 220 may protrude towards both sides of the support plate 210 to facilitate abutting the second rollers 400 on both sides.

Figure 4:
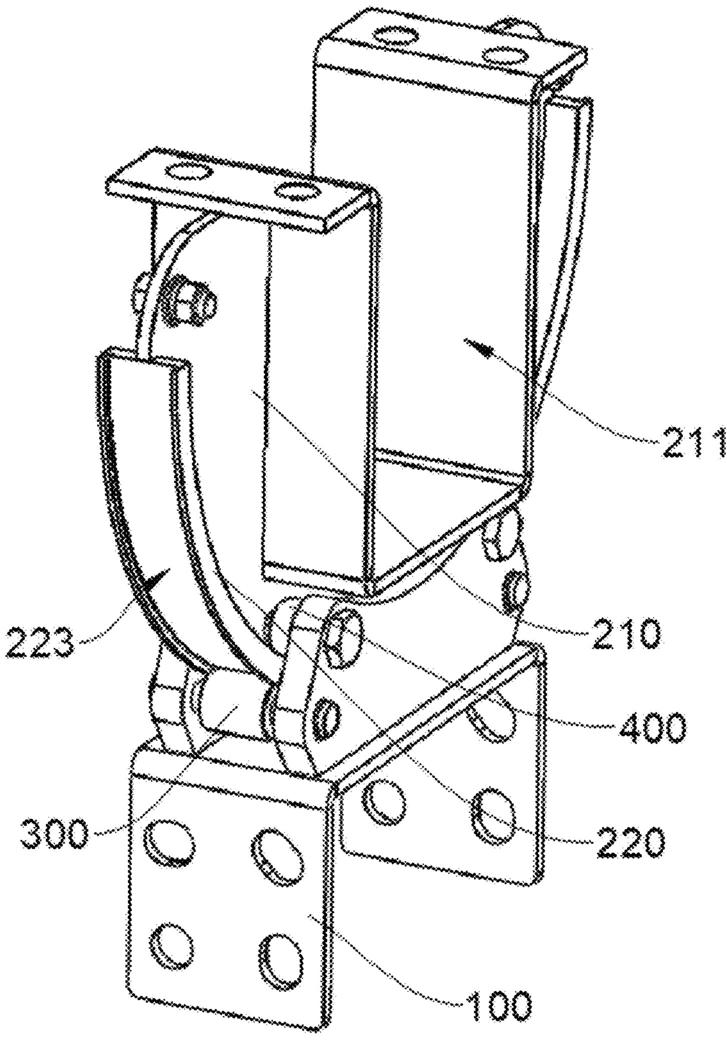
FIG. 4 is a schematic diagram of the support structure provided in other examples of the present disclosure.
Figure 5:
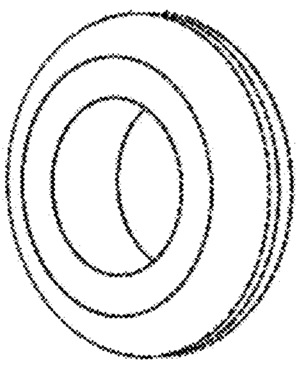
FIG. 5 is a schematic diagram of a first roller provided in an example of the present disclosure.
Figure 6:
FIG. 6 is a schematic diagram of a platen provided in an example of the present disclosure.
Figure 6:
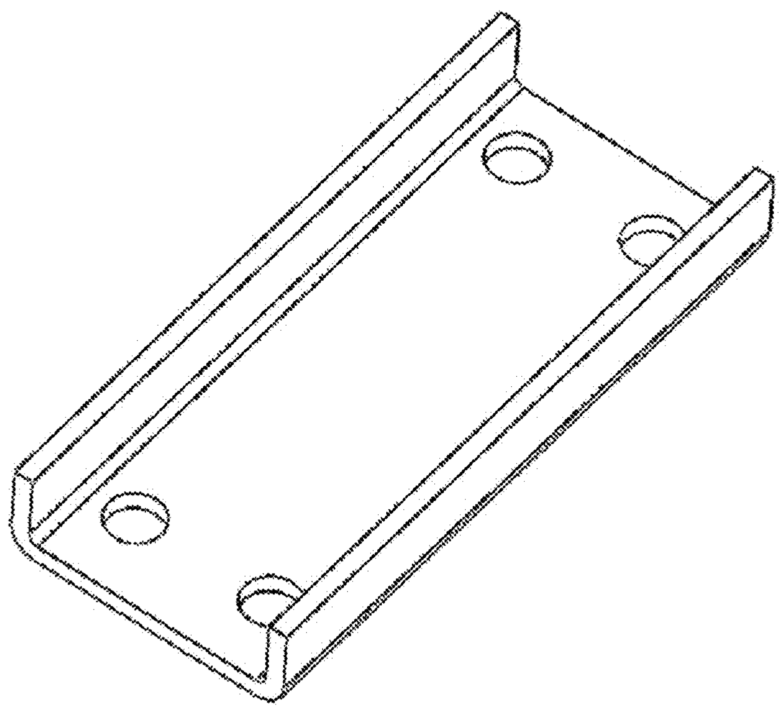

Furthermore, in some examples, as shown in FIG. 4, there may also be one roller guide slot 223, in which case the set of rollers comprises only one first roller 300 and two second rollers 400, wherein it should be noted that the support plate 210 is provided with a limiting groove 211 (shown in FIG. 4) for supporting the main beam 2000. The limiting groove 211 is a U-shaped groove. At the same time, the support structure 1000 further comprises a platen 600 (shown in FIG. 6). The platen 600 and support plate 210 are bolted together, and the side walls of the limiting groove 211 and platen 600 jointly define a limiting channel. The main beam 2000 is used to pass through the limiting channel to achieve the mounting of the main beam 2000.

Figure 11:
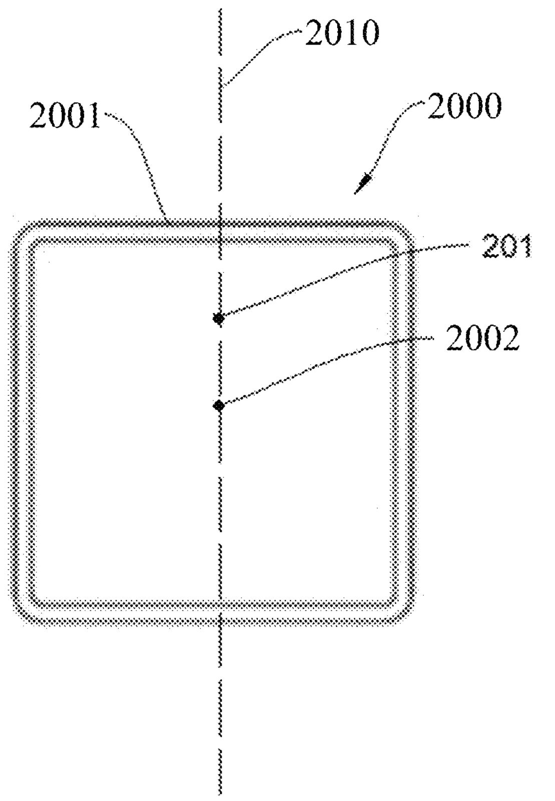
FIG. 11 is a schematic diagram of a main beam provided in an example of the present disclosure with a rectangular cross-section.

In the present example, the cross-section of the main beam 2000 is rectangular (shown in FIG. 11). Of course, in other examples, the support structure 1000 provided in the present example may also be applicable to main beams 2000 of other cross-sectional shapes, for example, the cross-section of the main beam 2000 may be circular (shown in FIG. 12), or the cross-section of the main beam 2000 may be polygonal, for example, hexagonal (shown in FIG. 13).

The position of the bearing base 100 remains unchanged during power generation by the photovoltaic module, and the rotation of the arc bearing 200 achieves the deflection of the photovoltaic module in the east-west direction on the main beam 2000, thereby achieving the tracking of azimuth changes of the sun.

Furthermore, the photovoltaic tracking support provided in the present example is also capable of effectively reducing the eccentric torque of the rotating part of the photovoltaic tracking support.

In particular, the center point of the arc bearing 200 and the center of the main beam 2000 may both coincide and not coincide in design. Typically, when the center point of the arc bearing 200 coincides with the center of the main beam 2000, the transmission of drive torque through the main beam 2000 is smoother. At the same time, under the action of strong winds, the transmission of oscillating torque by the main beam 2000 to the driver is also smoother, which is relatively unfavorable for inhibiting the torsional oscillation of the photovoltaic tracking support.

When the center point of the arc bearing 200 does not coincide with the center of the main beam 2000, the more favorable trend is to increase the radius of the arc bearing 200 and move the center point of the arc bearing 200 upward, which simultaneously reduces the eccentric torque of the rotating portion of the photovoltaic tracking support and is conducive to driving balance.

However, the greater the distance between the center point of the arc bearing 200 and the center of the main beam 2000, the less smooth the transmission of drive torque by the driver through the main beam 2000, and the less smooth the transmission of oscillating torque by the main beam 2000 to the driver under the action of strong winds. Moreover, the impact on such unsmooth transmission is relatively small at low-speed rotation, relatively large at high-speed rotation, and increases by multiples with the increase in rotational speed.

Thus, by appropriately increasing the distance between the center point of the arc bearing 200 and the center of the main beam 2000, torsional oscillation of the tracking support may be effectively inhibited.

However, the distance between the center point of the arc bearing 200 and the center of the main beam 2000 cannot be designed to be too large. If the distance is too large, when the driver transmits the driving torque, a stuttering phenomenon will occur between the arc bearing 200 and the bearing base 100. In severe cases, it will completely jam and cannot be rotated.

Typically, the center point 201 of the arc bearing 200 is disposed between the upper end face 2001 (as shown in FIG. 11) on the main beam 2000 and the center 2002 of the main beam 2000, and the center point 201 of the arc bearing 200 is located on the centerline 2010 in the vertical direction of the main beam 2000.

The upper end face 2001 of the main beam 2000 herein may be understood to be the upper end face of the main beam 2000 when the rotation angle is 0°.

Figure 12:
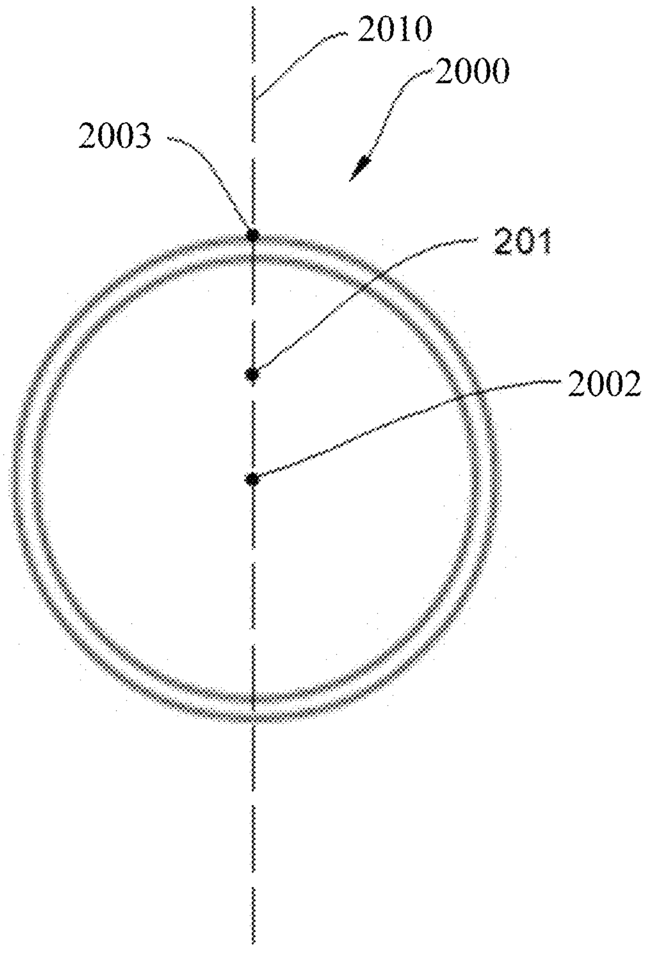
FIG. 12 is a schematic view of a main beam provided in another example of the present disclosure with a circular cross-section.
Figure 13:
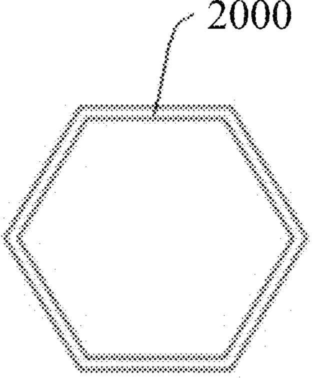
FIG. 13 is a schematic diagram of a main beam provided in another example of the present disclosure with a hexagonal cross-section.

Alternatively, as shown in FIG. 12, where the cross-section of the main beam 2000 is circular, the center point 201 of the arc bearing 200 is disposed between the highest point 2003 of the main beam 2000 and the center 2002 of the main beam 2000, and the center point 201 of the arc bearing 200 is located on the centerline 2010 in the vertical direction of the main beam 2000.

The highest point 2003 of the main beam 2000 herein may be understood to be the highest point of the main beam 2000 when the rotation angle is 0°.

During the specific application, the optimal distance between the center point 201 of the arc bearing 200 and the center 2002 of the main beam 2000 may be determined by testing.

Furthermore, it should be noted that referring to FIGS. 7-10, in the present example, the bearing base 100 comprises a connecting plate 110, a first plate body 120, a second plate body 130, a through shaft 140, and a cantilevered shaft 150. The first plate body 120 and the second plate body 130 are disposed at intervals on the connecting plate 110, and the through shaft 140 passes through the first plate body 120 and the second plate body 130 simultaneously, wherein the plurality of first rollers 300 rotate about the same through shaft 140.

wherein, the connecting plate 110 is used to connect to the upper end of the column (not shown in the figure), and the lower end of the column to the pile foundation to achieve support for the photovoltaic module.

There is a plurality of cantilevered shafts 150, in particular, there are four cantilevered shafts 150, with two cantilevered shafts 150 being connected to the first plate body 120, the other two cantilevered shafts 150 being connected to the second plate body 130, and each second roller 400 being rotatably connected to each cantilevered shaft 150.

In particular, in one set of rollers, the two first rollers 300 may rotate about the same through shaft 140, and the two second rollers 400 are respectively rotatably connected to the two cantilevered shafts 150, wherein the length of the cantilever shaft 150 is shorter than the length of the through shaft 140.

In particular, the end of the cantilever shaft 150 is provided with a retaining ring to prevent the second rollers 400 from sliding out axially, and the retaining ring is provided at both ends of the through shaft 140 to limit the first rollers 300 from sliding upward in the axial direction of the through shaft 140.

Figure 7:
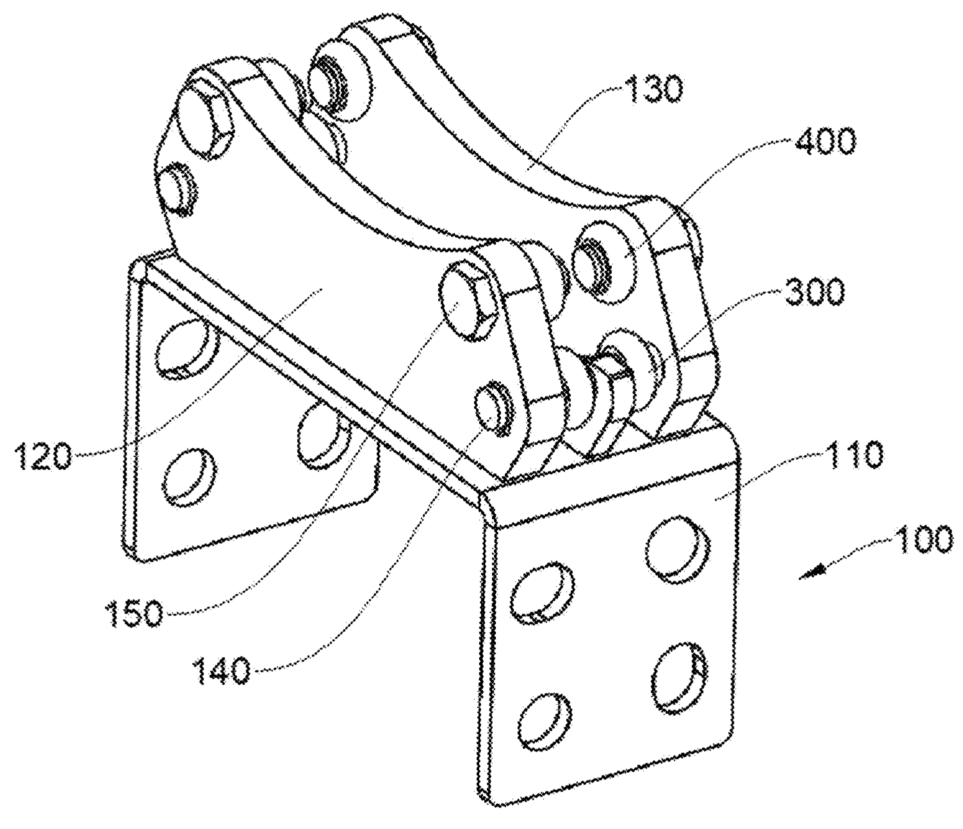
FIG. 7 is a schematic diagram of a bearing base provided in an example of the present disclosure.
Figure 8:
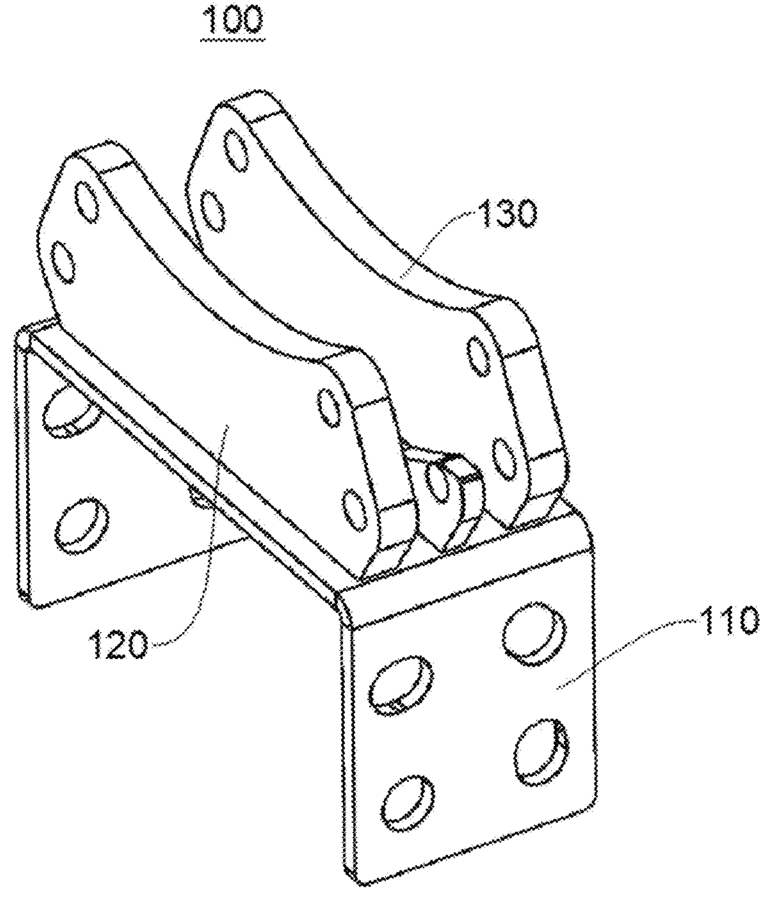
FIG. 8 is a schematic diagram of a bearing base provided in an example of the present disclosure after detaching a through shaft and a cantilevered shaft.
Figure 9:
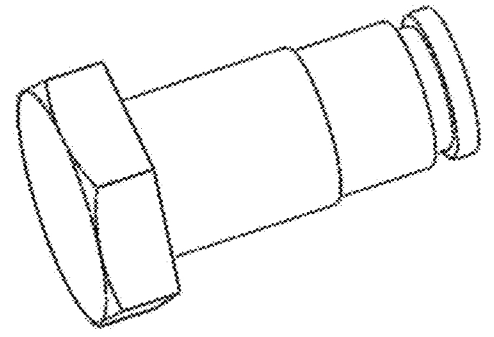
FIG. 9 is a schematic diagram of a cantilevered shaft provided in an example of the present disclosure.
Figure 10:
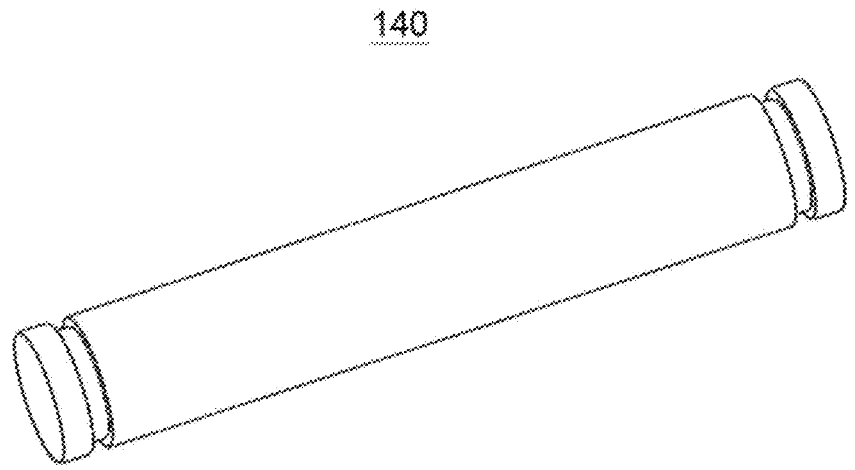
FIG. 10 is a schematic diagram of a through shaft provided in an example of the present disclosure.

Furthermore, it should be noted that when mounting the support structure 1000, as shown in FIG. 1, the arc bearing 200 is first firmly mounted below the main beam 2000 with the platen 600 and bolts, and then as shown in FIG. 7, the through shafts 140, the cantilever shafts 150 and the rollers are mounted on the bearing base 100, with the second rollers 400 mounted on the cantilever shafts 150, the first rollers 300 mounted on the through shafts 140, and then the arc bearing 200 is introduced between the first roller 300 and the second roller 400, and then locked with a limiting element 500 to prevent the arc bearing 200 from sliding out of the bearing base 100.

In summary, the support structure 1000 comprises a bearing base 100, an arc bearing 200, a first roller 300, and a second roller 400, the first roller 300 being rotatably connected to the bearing base 100, the second roller 400 being rotatably connected to the bearing base 100, the arc bearing 200 being used to support the main beam 2000 of the photovoltaic tracking support, the first roller 300 being used for rolling and abutting the arcuate outer sidewall 221 of the arc bearing 200, and the second roller 400 being used for rolling and abutting the arcuate inner sidewall 222 of the arc bearing 200 to rotate the arc bearing 200 relative to the bearing base 100.

Since both the first roller 300 and the second roller 400 are capable of limiting the motion of the bearing base 100, typically under gravity, the photovoltaic tracking support is supported on the first roller 300 at the arcuate outer sidewall 221 of the bearing base 100 through the arc bearing 200. During strong winds, the rotating portion of the photovoltaic tracking support produces an upward or downward deflection trend. At this point, the arc bearing 200 is abutted and limited by the second roller 400 at the arcuate inner sidewall 222, preventing upward deflection or the arc bearing 200 is abutted and limited by the first roller 300 at the arcuate outer sidewall 221, preventing downward deflection, such that it is always on the set motion trajectory, thereby maintaining the normal motion of the main beam 2000 on the set motion trajectory and ensuring the normal operation of the photovoltaic tracking support in tracking azimuth changes of the sun.

The support structure 1000 uses arcuate bearings combined with multi-point support. At the same time, it eliminates the eccentric torque of the rotating part of the photovoltaic tracking support and the impact of the eccenaxitricity of the main beam 2000 on torque transmission. Not only can it ensure the flexible rotation of the photovoltaic tracking support during slow tracking operation, it also effectively inhibits the torsional oscillation of the photovoltaic tracking support under the action of strong winds, fundamentally eliminating torsional resonance damage of the tracking support caused by strong winds, making the operation of the tracking support safer and more reliable.

At the same time, the support structure 1000 has strong resistance to oscillation and is capable of fundamentally eliminating torsional resonance damage of the photovoltaic tracking support; the bearing arc of the support structure 1000 rotates smoothly and is capable of withstanding relatively strong uplift force and has strong load carrying capacity; the support structure 1000 is supported by two sets of rollers, with a relatively large spacing between the two support points, making the support smoother and more reliable; the support structure 1000 is capable of effectively reducing the eccentric torque of the rotating part of the photovoltaic tracking support, which is conducive to driving balance; the support structure 1000 has a simple structure and has high degree of factory integration, making it easy to mount on site.

The photovoltaic tracking support comprises the main beam 2000 and the support structure 1000 described above. The arc bearings 200 of the plurality of support structures 1000 are mounted at intervals along the length direction of the main beam 2000, and the photovoltaic tracking support has all the functions of the support structure 1000 described above.

The examples above are only specific embodiments of the present disclosure, but the scope of protection of the present disclosure is not limited thereto. Any changes or replacements that can be easily thought of by those skilled in the art within the scope of the technology disclosed by the present disclosure should be covered by the scope of protection of the present disclosure. Therefore, the scope of protection of the present disclosure shall be based on the scope of protection of the Claims.

The invention claimed is:

1. A photovoltaic support structure comprising:

a main beam of a photovoltaic tracking support in communication with a platen, the platen in communication with a first arc bearing, the first arc bearing in communication with a bearing base;

a first roller rotatably connected to the bearing base, the first roller in communication with an arcuate outer sidewall of the arc bearing; and a second roller rotatably connected to the bearing base, the second roller in communication with an arcuate inner sidewall of the arc bearing.

2. The photovoltaic support structure of claim 1, wherein rotation of the arc bearing occurs in a predetermined set motion trajectory due to the first roller and the second roller limiting the movement of the arc bearing.

3. The photovoltaic support structure of claim 2, wherein the first roller limits a downward movement of the arc bearing and the second roller limits an upward movement of the arc bearing.

4. The photovoltaic support structure of claim 1, wherein the arcuate outer sidewall further comprises a roller guide slot, and wherein the roller guide slot is configured to guide the first roller.

5. A photovoltaic support structure comprising:

a main beam of a photovoltaic tracking support in communication with a platen, the platen in communication with a first arc bearing, the first arc bearing in communication with a bearing base;

a plurality of first rollers rotatably connected to the bearing base, the plurality of first rollers in communication with an outer sidewall of the arc bearing; and a plurality of second rollers rotatably connected to the bearing base, the plurality of second rollers in communication with an arcuate inner sidewall of the arc bearing.

6. The photovoltaic support structure of claim 5, wherein an axis of rotation of the plurality of first rollers, an axis of rotation for the plurality of second rollers, and an axis of rotation for the arc bearing are all parallel.

7. The photovoltaic support structure of claim 5, wherein the plurality of first rollers limits a downward movement of the arc bearing and the plurality of second rollers limits an upward movement of the arc bearing.

8. The photovoltaic support structure of claim 5, wherein the arcuate outer sidewall further comprises a roller guide slot, and wherein the roller guide slot is configured to guide the plurality of first rollers.

9. The photovoltaic support structure of claim 5, further comprising a limiting element connected to the arc bearing, the limiting element being used to abut the second roller when the arc bearing is rotated to a predetermined maximum angle.

10. The photovoltaic support structure of claim 5, wherein the plurality of first rollers and the plurality of second rollers are configured to minimize torsional oscillation of the arc bearing.

11. A photovoltaic support structure comprising:

a bearing base;

a first roller rotatably connected to the bearing base;

a second roller rotatably connected to the bearing base; and an arc bearing for supporting a main beam of a photovoltaic tracking support, the first roller being used for rolling and abutting an arcuate outer sidewall of the arc bearing, and the second roller being used for rolling and abutting an arcuate inner sidewall of the arc bearing for rotating the arc bearing relative to the bearing base.

12. The photovoltaic support structure of claim 11, wherein the arc bearing comprises a support plate and an arcuate plate, the arcuate plate having the arcuate inner sidewall and the arcuate outer sidewall, the support plate and the arcuate inner sidewall being connected, and the support plate being used to support the main beam of the photovoltaic tracking support.

13. The photovoltaic support structure of claim 11, wherein a portion of the arcuate outer sidewall is recessed toward the arcuate inner sidewall to form and provide a roller guide slot, and the first roller is used for rolling and abutting the roller guide slot.

14. The photovoltaic support structure of claim 13, further comprising a plurality of roller guide slots and a plurality of first rollers, the plurality of the roller guide slots being distributed in parallel, and at least one of the plurality of first rollers being used for rolling and abutting the plurality of roller guide slots.

15. The photovoltaic support structure of claim 14, wherein the bearing base comprises a connecting plate, a first plate body, a second plate body and a through shaft, the first plate body and the second plate body being disposed at intervals on the connecting plate, and the through shaft passing through the first plate body and the second plate body simultaneously, and wherein the plurality of the first rollers rotate about the same through shaft.

16. The photovoltaic support structure of claim 15, wherein the bearing base further comprises a cantilevered shaft connected to the first plate body, with the second roller rotatably connected to the cantilevered shaft.

17. The photovoltaic support structure of claim 11, wherein the support structure further comprises a limiting element connected to the arc bearing, the limiting element being used to abut the second roller when the arc bearing is rotated to a predetermined maximum angle.

18. The photovoltaic support structure of claim 11, wherein the support structure comprises a plurality of sets of rollers that are respectively located at a plurality of support positions distributed at intervals on the arc bearing, and wherein there is a plurality of first rollers and plurality of second rollers, and a first of the plurality of first rollers and a first of the plurality of second rollers located at the same support position of the arc bearing form a first set of rollers.

19. A photovoltaic support structure of claim 11, further comprising a plurality of support structures and plurality of arc bearings, wherein the plurality of arc bearings in communication with the plurality of support structures are mounted at intervals along a length direction of the main beam.

20. The photovoltaic support structure of claim 11, wherein a center point of the arc bearing is disposed between a upper end face of the main beam and a center of the main beam, and the center point of the arc bearing is located on a centerline in a vertical direction of the main beam.

* * * * *